United States Patent

[11] 3,630,087

| [72] | Inventors | Colin William Ogden<br>Mansfield;<br>Alec Bailey, Arnold, both of England |
|---|---|---|
| [21] | Appl. No. | 10,935 |
| [22] | Filed | Feb. 12, 1970 |
| [45] | Patented | Dec. 28, 1971 |
| [73] | Assignee | Smith-Denis Limited<br>Nottingham, England |
| [32] | Priority | June 13, 1969 |
| [33] | | Great Britain |
| [31] | | 30,004/69 |

[54] SUMMATION GAUGE
8 Claims, 3 Drawing Figs.

[52] U.S. Cl. ......................................................... 73/412
[51] Int. Cl. ................................................. G01l 15/00
[50] Field of Search ........................................... 73/412;
177/141, 208, 209, 247

[56] References Cited
UNITED STATES PATENTS

| 2,877,906 | 3/1959 | Coash et al. ................ | 177/141 |
| 997,188 | 7/1911 | Fournier ......................... | 73/412 X |
| 2,068,663 | 1/1937 | Diehl ............................ | 73/412 X |
| 1,581,768 | 4/1926 | Wiley ........................... | 177/247 X |
| 1,579,658 | 4/1926 | Pugh ............................ | 177/141 |
| 2,166,153 | 7/1939 | Huck ............................ | 73/412 X |

FOREIGN PATENTS

| 726,233 | 10/1942 | Germany ..................... | 73/412 |

Primary Examiner—Louis R. Prince
Assistant Examiner—Daniel M. Yasich
Attorney—George B. White ABSTRACT: A summation gauge which gives the sum, and/or the mean, of two fluid pressures which are applied respectively to two Bourdon tubes. The moving ends of these tubes are connected to opposite ends of a balance beam which, at a central point in its length, is connected to a gauge quadrant. In an elaboration of this gauge, for giving the sum, and/or the mean, of four separate pressures, the Bourdon tubes and their beams are duplicated. The two beams are connected, each at a central point in its length, to the opposite ends respectively of a main balance beam which is connected, at a central point in its length, to the quadrant.

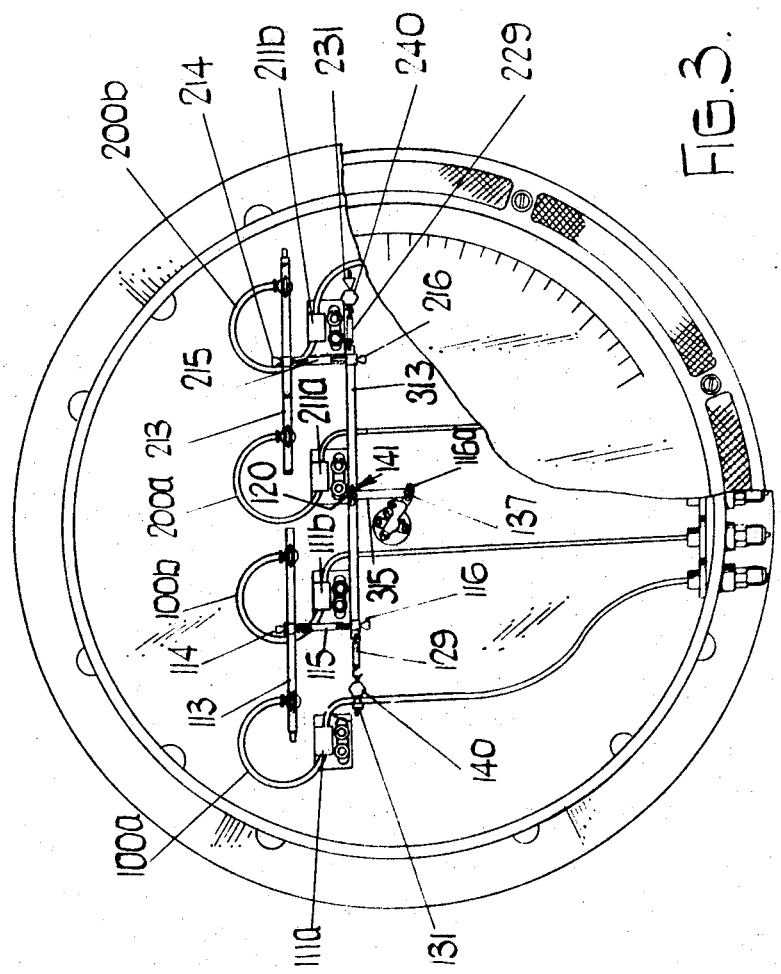

SUMMATION GAUGE

CROSS-REFERENCE TO OTHER APPLICATIONS

Reference is made to British Pat. application No. 30004/69 of June 13, 1969, Smith-Dennis Limited, from which priority is claimed.

SUMMARY OF THE INVENTION

An object of this invention is to provide a gauge which will provide or indicate (which expression is also employed to include record) the sum, and/or the mean, of simultaneously applied pressures from two different sources. These different pressure may be positive, or negative, or one may be positive and the other negative. A gauge according to this invention may be employed to indicate the sum of the weights on the front wheels, or the two rear wheels, or two side wheels, of a vehicle, such wheels resting on pressure-transmitting devices whereby a pressure proportional to the applied weight is transmitted to pressure-sensitive devices in the gauge.

The invention provides a summation gauge for providing the sum of two separate pressures, comprising two pressure-sensitive devices for responding respectively to separately applied pressures, a balance beam connected to them at its opposite ends, and a connection between a central fulcrum point of said beam and indicating means, the construction and arrangement being such that upon response of the devices to separately applied pressures the movement of said central point is proportional to the sum of these pressures and is transmitted to the indicating means.

The pressure-sensitive devices are preferably fluid-pressure-sensitive devices; they may be of the bellows or capsule type, but preferably are Bourdon tubes. These Bourdon tubes are best arranged to occupy substantially a common plane curved are curved in the same direction. This ensures that the ends of the tubes make movements in the same direction.

Desirably, means are provided for adjusting the position of at least one of (and preferably each of) the devices, and the beam, in the direction of the length of the latter.

Each pressure-sensitive device may be connected to the beam by a pin-and-slot connection permitting relative adjustment of the beam lengthwise and by a spring extending between each device and the beam, which springs act in opposite directions lengthwise of the beam.

In order that the invention may be better understood, reference will now be made to the accompanying drawings, in which:

FIG. 3 is a view, similar to FIG. 1, showing a gauge for indicating the sum of four separate pressures.

Figure 1:
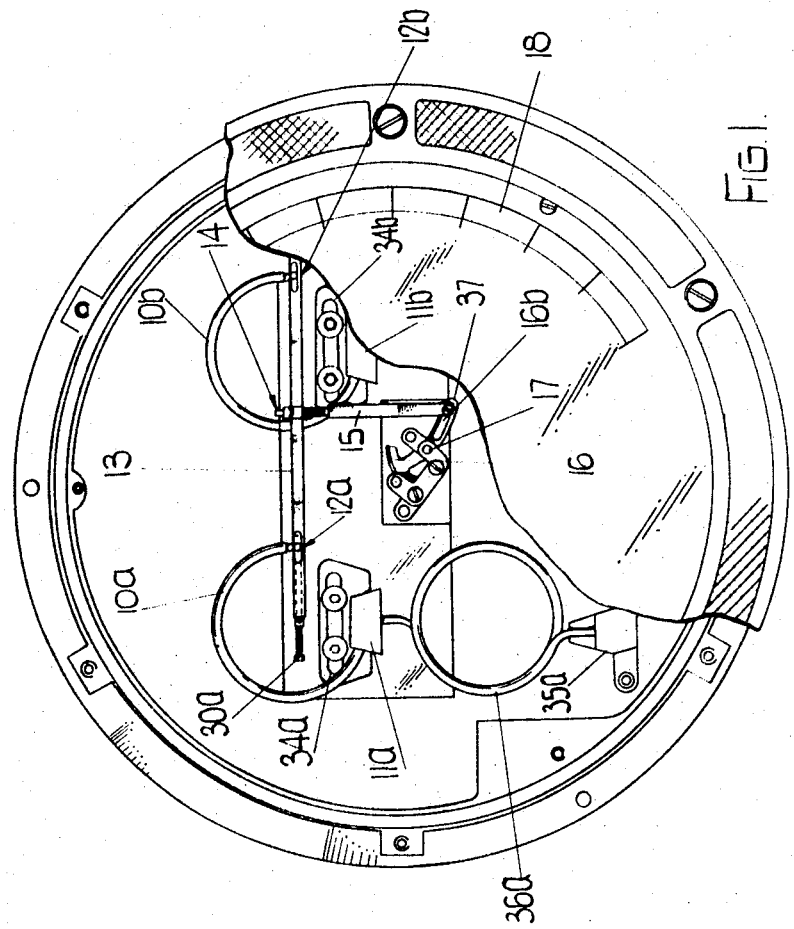
FIG. 1 is an elevation of a gauge, according to the invention partly broken away to show its interior construction.
Figure 2:
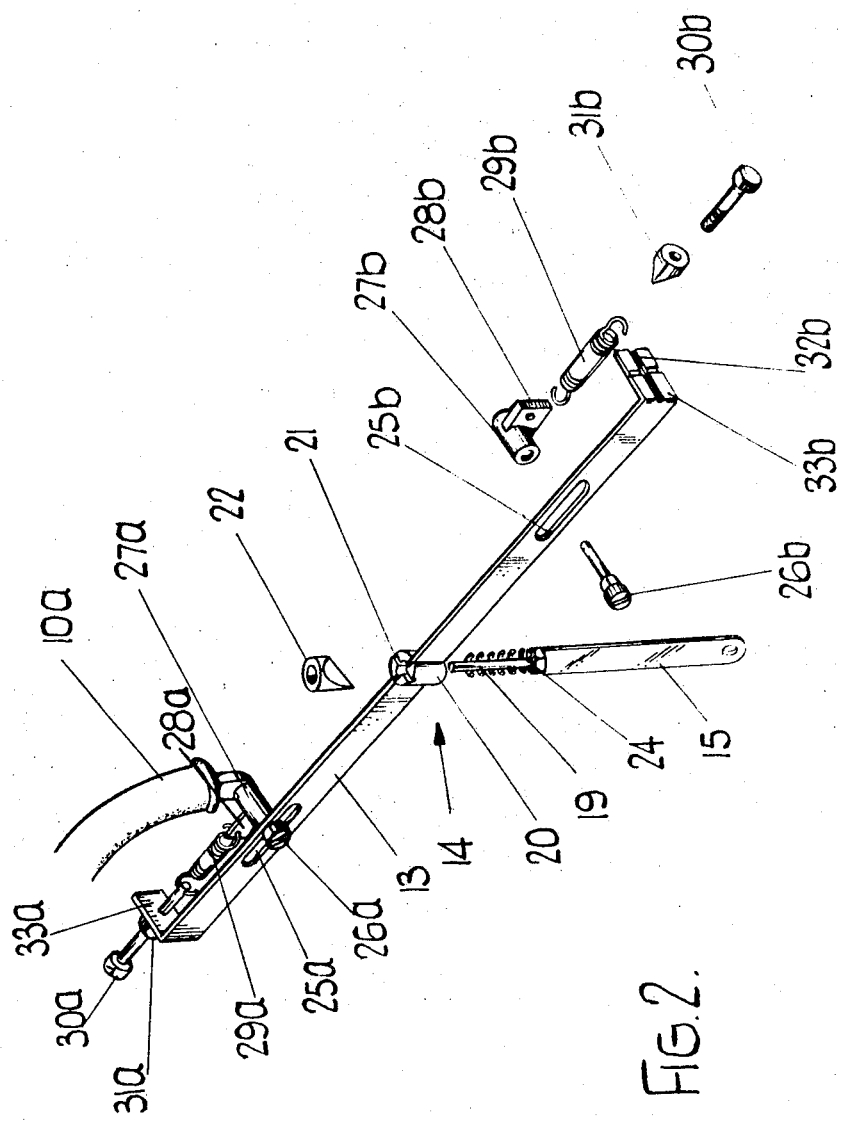
FIG. 2 is a perspective view of the beams and associated parts.

The gauge illustrated in FIGS. 1 and 2 comprises two identical Bourdon tubes 10a, 10b, the fixed ends of which are anchored in union blocks 11a, 11b. These two tubes are located substantially in a common plane and, as is seen, they both curve in the same direction. Their respective free ends (which are closed) are connected at 12a and 12b to a balance beam 13 which, at a point centrally between said connections 12a, 12b, is itself pivotally connected by a knife edge device 14 to a tie rod 15 which in turn is pivotally connected at 37 to the arm of a quadrant 16, pivoted at 17, which quadrant moves an operating pointer (not shown) over a graduated scale 18 in known manner. The connection point 37 is adjustable along the quadrant arm by means of a slot 16b.

The scale 18 may be graduated to show the sum of the two pressures, and/or their mean (being half the sum).

The tie rod 15 is provided at its upper end with a screw-threaded stem 19, which extends slidably through the bore of a boss 20, attached to the beam 13, said boss having a v-shaped notch 21 at its upper end. The stem 19 is adjustably screwed into a knife edge member 22 which seats in the notch. The knife edge member 22 is held into the notch 21 by means of a compression spring 24, which encircles the stem 19 between a suitable abutment on the tie rod 15 and the underside of boss 20.

The connections between the closed ends of the Bourdon tubes and the beam are as follows and are best shown in FIG. 2. Near its ends, the beam has longitudinal slots 25a, 25b. Shoulder screws or pins 26a, 26b extend through these slots and through bushes 27a, 27b and are screwed into anchorages at the ends of the Bourdon tubes, so that they clamp these bushes against the ends of the tubes. The screws 26a, 26b are slidable lengthwise of their slots, but are biased in the following manner: each bush carries a lug 28a, 28b having a hole into which the end of a tension spring 29a, 29b is hooked, the other end of the spring being hooked into a hole in the end of an adjustment screw 30a, 30b, which extends through a tapped hole in a knife edge member 31a, 31b and then through a hole in the in-turned end 33a, 33b of the balance beam 13. Each knife edge member 31a, 31b is engaged in a knife edge groove in said end 33a, 33b, only the groove 32b in the last-mentioned end being clearly shown in FIG. 2.

It will thus be seen that by adjusting screws 30a, 30b the position lengthwise of the beam at which the Bourdon tubes are connected to it can be adjusted. Additionally, each bush 27a, 27b can be adjusted about its clamping screw 26a, 26b to adjust the level of the hole in its lug 28a, 28b in relation to the hole in screw 30a, 30b. Thereby each screw 26a, 26b can be caused to bear against the upper edge, or lower edge, of its associated slot 25a, 25b, or one of screws 26a, 26b can be caused to bear against the upper edge, and other against the lower edge, of its slot.

The unions 11a, 11b on which the Bourdon tubes are carried are adjustable in the direction of the length of the balance beam 13 by screw-and-slot connections indicated generally at 34a, 34b. In order to permit in this adjustment the unions 11a, 11b are connected to fixed position inlets by coiled tubes. Only the inlet 35a and the coiled tube 36a for the Bourdon tube 10a appear in FIG. 1, the arrangement for tube 10b being similar.

The tie rod 15 is screwed into the knife edge member to an extent sufficient to cause that end of the quadrant 16 to which it is connected to travel to substantially equal extents above and below a medial line parallel with the beam 13. The adjustment mechanism indicated at 34a, 34b permits the beam 13 to be so adjusted endwise that the tie rod 15 extends at right angles to it. The adjustment afforded by screws 30a, 30b permits the fulcrum point provided by device 14 to be shifted slightly to cancel out differences in the response characteristics of the tubes to application of fluid pressure, the tubes being so chosen that so far as is possible their characteristics are identical.

It is intended that, in one application of the gauge, each inlet such as 35a shall be connected to a sealed load cell by means of a pipeline, so that a continuous vein or column of liquid extends from the liquid in each load cell, through the pipeline through the connections such as 35a, 36a, and through the Bourdon tube to the closed end thereof, this vein being placed under pressure by load applied to the load cell.

In another application of the gauge it may be used to indicate the sum of the pressures in two fluid-supply sources (e.g., air supply lines) by connecting the inlets to these sources.

FIG. 3 is a view, similar to FIG. 1, of a gauge for showing the sum, and/or the means, of four separate fluid pressures which may, for example, be derived from the loads on four wheels of a vehicle.

There are two pairs 100a, 100b and 200a, 200b of the pressure-sensitive devices the ends of which are connected to the ends of balance beams 113, 213, these balance beams extending in the same direction and being aligned. Each beam is connected at a central fulcrum point 114 or 214 to a vertical tie rod 115 or 215 as already described with reference to FIGS. 1 and 2. The lower ends of rods 115, 215 are connected at 116, 216 by fulcrum connections which are similar to connection 14 but are inverted, to the opposite ends of a main balance beam 313 which main beam is parallel to the first two beams. The ends of beam 313 are anchored by oppositely acting tension springs 129, 229, to anchorages 140, 240. At a central point 120 in its length, beam 313 is adjustably connected, by a pivotal pin-and-slot connection 141 to the upper end of a vertical tie rod 315 the lower end of which is adjustably and pivotally connected at 137 by a pin-and-slot connection to the arm 116a of a quadrant. Rod 135 may be adjustable for length. The tensioning springs 129, 229 and the endwise position of beam 313, can be adjusted by fulcrum nuts 131, 231 bearing against the anchorages 140, 240. The devices 100a, 100b, 200a, 200b are mounted in adjustable union blocks 111a, 111b, 211a, 211b which are adjustable as, and for the same purpose as, blocks 11a, 11b of FIG. 1.

It will readily be appreciated this gauge gives the sum (and/or the mean) of four fluid pressures applied to the devices 100a, 100b, and 200a, 200b.

Following the description of the invention as incorporated in a visually indicating gauge, its incorporation in a recording gauge will present no difficulty to a recording instrument manufacturer.

What is claimed is:

1. A summation gauge for providing the sum or mean of two separate pressures, comprising:
   a. two pressure-sensitive devices for responding respectively to separately applied pressures,
   b. a balance beam connected to said two devices at its opposite ends and having a central fulcrum point displaceable in accordance with the sum of the two pressures,
   c. indicating means responsive to said sum, and
   d. an operating connection between said fulcrum point and indicating means for transmitting said displacement to the indicating means,
   e. whereby upon response of said devices to separately applied pressures the displacement of said fulcrum point is proportional to the sum of said pressures and is transmitted to the indicating means,
   f. a pin-and-slot connection between each said device and the associated end of the beam for permitting relative adjustment of the beam endwise,
   g. a spring extending between each device and the associated end of the beam which springs act in opposite directions lengthwise of the beam.

2. A gauge according to claim 1, wherein the indicating means comprises a rock arm for movement by the balance beam to actuate said indicating means, and the operating connection extends between said fulcrum point and the rock arm.

3. A gauge according to claim 1, wherein the devices are Bourdon tubes mounted in tandem and both curved in the same direction.

4. A gauge according to claim 1, having adjustment means for adjusting the position of at least one of the devices, and the beam, in the direction of the length of the latter.

5. A gauge according to claim 1, wherein each pin-and-slot connection comprises a slot extending lengthwise of the beam, and a pin extending through the slot and fixed to the moving end of the tube, said spring biassing the pin along the slot away from the fulcrum point.

6. A gauge according to claim 1 for providing the sum of four separate pressures, comprising two pairs of the said pressure-sensitive devices for responding to four separately applied pressures, an aforesaid balance beam for each pair of devices, each of which beams is connected at its opposite ends to the devices of the appropriate pair, a main balance beam, connections between central fulcrum points of the first beam and opposite ends of the main beam, and a connection between a central point of the main beam and the indicating means.

7. A gauge according to claim 6, having the two first said beams extending in the same direction and having the main balance beam parallel to them.

8. A gauge according to claim 6, having springs connected to the ends of the main beam and urging the latter in opposite directions, and means for adjusting the springs.

* * * * *